United States Patent Office 3,007,496
Patented Nov. 7, 1961

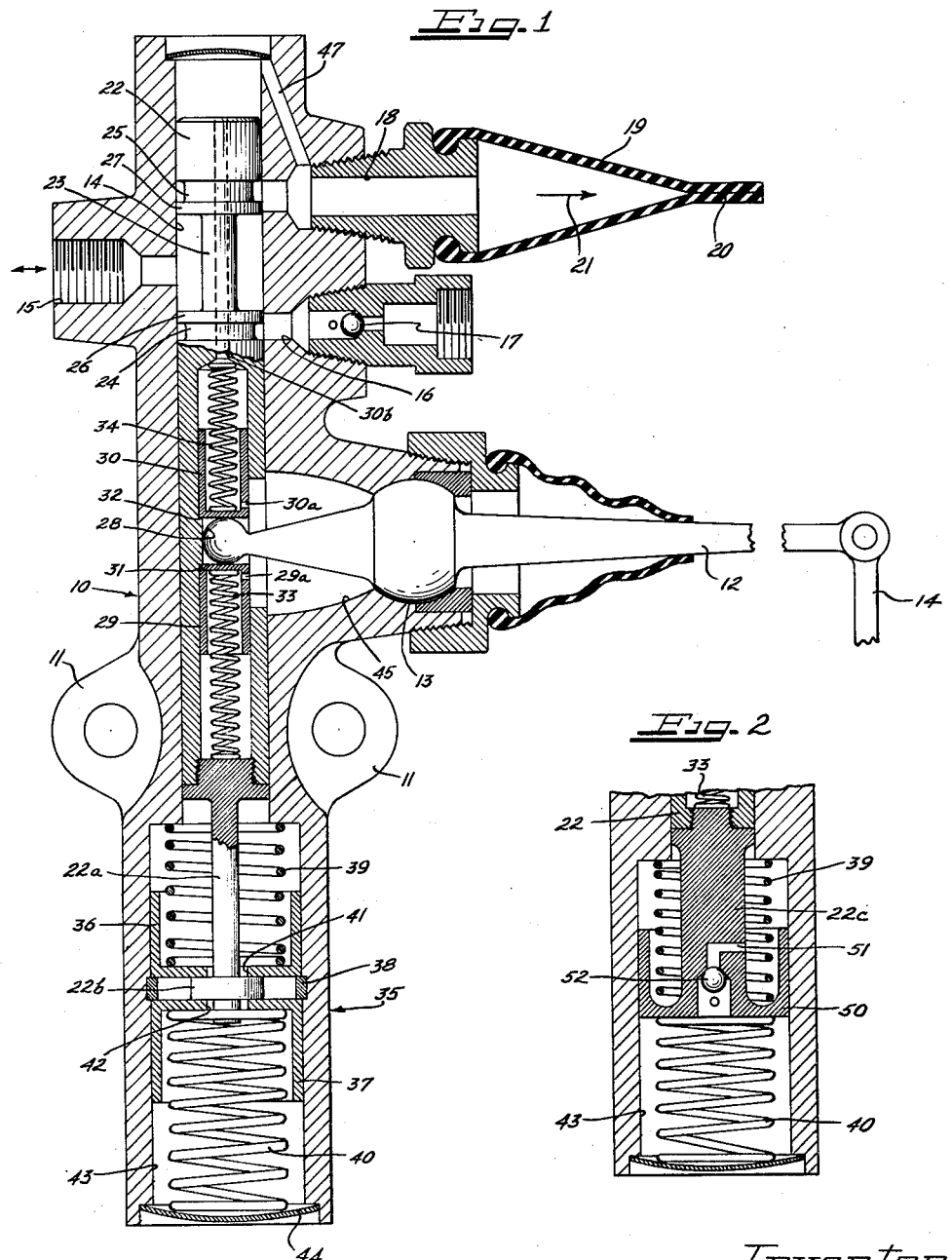

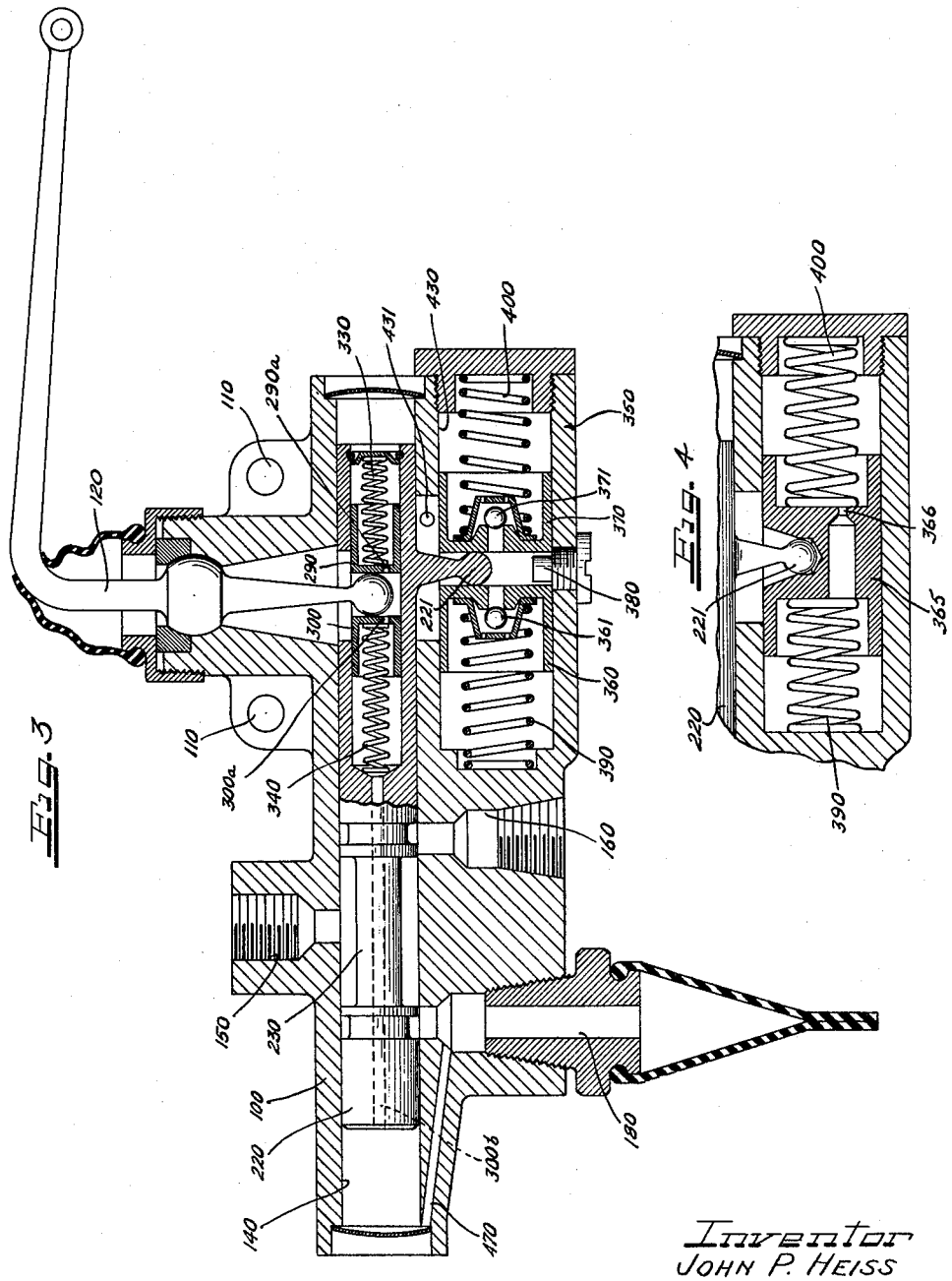

3,007,496
LEVELING VALVE
John P. Heiss, Flint, Mich., assignor to Thompson Ramo Wooldridge, Inc., a corporation of Ohio
Filed Sept. 13, 1955, Ser. No. 534,065
7 Claims. (Cl. 137—627.5)

The present invention relates to automatic leveling systems for road vehicles or the like and is, more particularly, concerned with the provision of a novel and substantially improved leveling control valve for use in leveling systems of the general type having hydraulic, jack-type leveling struts.

As those skilled in the art of vehicle suspension are aware, numerous patents have been obtained, and many experimental structures manufactured, utilizing pneumatic or hydraulic suspension struts. Such struts comprise, in general, a piston and cylinder apparatus wherein the cylinder is pivotally secured to the vehicle frame and the piston is pivotally secured to the vehicle axle housing adjacent each of the individual rear vehicle wheels. Hydraulic fluid, or air may then be introduced into the cylinder to lift the frame relative to the axle housing to a predetermined adjusted position which may be termed the "design attitude" of the vehicle. When weight is added to the vehicle over the wheels thus suspended, the piston and cylinder combinations tend to contract, lowering the vehicle frame at that point. In accordance with prior art systems well known in the art, additional fluid or air is introduced to the piston and cylinder to again lift the vehicle frame to its design attitude condition.

It will be apparent that vehicle leveling thus requires apparatus for controlling the introduction of hydraulic fluid, either liquid or gas, to the piston and cylinder combination. This may, of course, be accomplished manually but it is preferred that means be provided for accomplishing the leveling function automatically. In accordance with the principles of the present invention, such automatic adjustment is provided by a novel controlling valve which is not only capable of sensing the instantaneous position of the vehicle frame relative to the wheels suspended therefrom, but is also capable of, in effect, analyzing the nature of the movements of the frame relative to the wheels to determine whether or not such movement is the result of a change in vehicle loading or merely an instantaneous variation resulting from road conditions or the like. Upon determining the type of movement involved, the leveling valve of the present invention automatically directs additional fluid under pressure to the piston and cylinder, or strut, combination for lifting the vehicle body if an increased continuous load has been applied to the vehicle frame, or, alternatively, lowering the vehicle frame by permitting the withrawal of hydraulic fluid if the load is removed. If, on the other hand, the leveling valve of the present invention determines that the forces applied to the system tending to change the relative positions of the vehicle frame and wheels is an instantaneous one, such as would result from traveling over a rough or washboard road, it makes no movement to modify the level of the vehicle suspension struts. As a result, the leveling valve of the present invention operates to provide completely automatic ride leveling for automotive vehicles thereby eliminating any need for the constant attention of the vehicle operator while effectively maintaining the vehicle in a predetermined optimum level or "attitude."

The automatic analysis and control are provided in accordance with the present invention by means of a movable fluid control valve having an actuator movable in response to variations in relative vehicle frame and axle positions. The actuator is connected to the valve directly so that the valve moves in direct relation to the actuator, but the connection between the valve and the actuator is resilient. This resiliency permits movement of the actuator without a corresponding movement of the valve if the valve is temporarily restrained against movement. In accordance with the present invention, a damping means is secured to the valve to retard the movement thereof in a direction tending to move away from a valve-neutral condition in which the vehicle is positioned at its predetermined optimum attitude. Accordingly, if a relatively permanent load addition is applied to the vehicle frame, the valve actuator will instantly reflect this additional load by sensing the downward movement of the frame, and will attempt to move the valve. The damping means will, however, permit only a gradual movement of the valve and, since the load change is relatively permanent, the valve will be moved to change the vehicle level after a short interval of time, such as for example several seconds. If, however, an instantaneous load force is applied, such as would occur in passing a bump, the valve is prevented from operating to change the attitude of the vehicle by the damping means. The damping means and resilient connection thus operate to provide a delayed action valve actuating mechanism performing the automatic valve control functions above noted.

It is, accordingly, an object of the present invention to provide a novel automatic vehicle leveling valve.

Another object of the present invention is to provide an improved leveling valve having means therein for permitting valve actuation only under the application of relatively permanent forces to the system under control of the valve.

A further object of the present invention is to provide a fluid control valve actuated through a resilient connection permitting valve movement in response to actuator movement only under the circumstances in which the actuator movement is maintained over a substantial period of time.

Yet a further object of the present invention is to provide a leveling valve wherein movement of the valve to vary the position of a vehicle frame is prevented except upon the application of a continuous force to the valve actuating lever but wherein movement of the valve back toward its neutral position is permitted without the application of delay mechanism.

A feature of the invention resides in the provision of a reciprocable fluid controlling valve core actuated by means of a pivotal lever through a spring connection.

Another feature of the invention is a fast acting dashpot damping means secured to a reciprocable fluid control valve to apply a substantial delay to movement of the valve in either direction away from neutral but to permit a return of the valve to its neutral condition at a rapid rate.

Another object of the present invention is to provide an extremely compact automatic leveling valve capable of fully automatic operation.

Still other and further objects and features of the present invention will at once be apparent to those skilled in the art from a consideration of the attached drawings wherein several modifications of the invention are shown by way of illustration only and, wherein:

FIGURE 1 is a side elevational view in cross-section of a valve constructed in accordance with the present invention;

FIGURE 2 is a fragmentary view of a modified form of the valve shown in FIGURE 1 and illustrating a different form of damping means therefor;

FIGURE 3 is a side elevational view of still a further form of leveling valve constructed in accordance with the principles of the present invention; and FIGURE 4 is a fragmental view of a modification of the form shown in FIGURE 3.

As shown on the drawings:

As illustrated in FIGURE 1, the improved leveling valve of the present invention comprises a housing generally indicated at 10 having bolt flanges 11 for rigid attachment to a vehicle frame. In the form illustrated, the housing 10 is secured in the vehicle with its longitudinal axis generally vertical. This positioning permits attachment of the valve actuating lever 12 which is pivotally secured to the housing 10 at 13, to the generally horizontal axle housing of a vehicle by the generally vertical link 14. It will be understood, of course, that the valve of the present invention may be utilized with substantially any type of vehicle suspension known and that the lever 12 may be linked to the axle housing of a one-piece driving rear axle, or to the brake backing plate of an independently suspended rear wheel, or to such structure associated with vehicle front wheels. The nature of the connection between the lever 12 and the individual vehicle wheels is thus unimportant as far as the present invention is concerned and it will be understood that the only necessity is that the lever 12 pivot, about the point 13, in a counter-clockwise direction when the vehicle frame moves downwardly relative to the vehicle wheel associated with the lever 12, and in a clockwise direction when the vehicle frame moves upwardly relative to the wheel. Since such a connection may comprise manifold forms and is unimportant to the present invention, insofar as its details are concerned, it is omitted from the drawings.

The valve housing 10 is provided with a lateral conduit bore 15 leading from the axial or longitudinal cylindrical bore 14 to an associated leveling strut or the like positioned in any conventional manner between the vehicle frame and the road wheel whose movement is sensed by the control lever 12. The application of pressure to the bore 15 is adapted to extend the strut to thereby raise the vehicle relative to the wheel and the venting of the bore 15 to a low pressure reservoir, or atmosphere, will permit the contraction of the strut under the weight of the vehicle body, to lower the frame relative to the wheel.

Hydraulic fluid under pressure is introduced to the longitudinal valve bore 14 via lateral bore 16 and check valve 17. Hydraulic fluid is vented from the bore 14 via exhaust bore 18. If the fluid comprises a liquid, the bore 18 passes the liquid to a reservoir for subsequent repressurization. On the other hand, if the hydraulic fluid is air or other gas, the bore 18 is vented to atmosphere via a rubber boot 19 illustrated in FIGURE 1. The boot 19 is provided with a constricted end 20 forming in operation, a check valve which permits the flow of air in the direction of the arrow 21 but prevents the introduction of dirt or any other form of contamination back into the conduit 18 in the reverse direction.

The valve core 22 controls the distribution of pressurized fluid from the bore 16 and is provided with a central annular groove 23 and a pair of longitudinally spaced annular grooves 24 and 25. In the view shown in FIGURE 1, the valve core 22 is positioned in its neutral condition in which pressurized fluid in the bore 16 encircles the core 22 in the annular groove 24, thereby providing lateral balance for the valve core 22, but is prevented from flow to the valve outlet bore 15 by the land 26. Likewise, pressure already in the bore 15 is prevented from egress via the bore 18 by the land 27. When the valve core 22 is shifted axially by means of the actuating lever 12, it will be clear that upward movement of the core 22 will vent the bore 15 to the bore 18 while downward movement of the core 22 will introduce hydraulic fluid under pressure from the bore 16 to the bore 15. Fluid is prevented from passing back through the inlet pressure bore 16 by the check valve 17, thereby eliminating possible injury to the pressure source resulting from shocks to the hydraulic fluid introduced at the leveling strut during the time when the bore 16 is in fluid connection with the bore 15. The check valve 17 also prevents flow of fluid from port or bore 15 through bore 16 to permit collapse of the leveling strut when the source of fluid pressure at 16 decays or is removed.

The valve core 22 is reciprocated, as above noted, by the actuating lever 12. This reciprocation is accomplished through the ball end 28 on the lever 12, which cooperates with opposed plungers 29 and 30. The plungers 29 and 30 are maintained in centered condition relative to the core 22, against abutment shoulders 31 and 32 by springs 33 and 34 respectively. In view of the resilient nature of the springs 33 and 34, it will be apparent that the actuating lever 12 may be oscillated throughout its normal range of movement without positively moving the core 22 when the latter is restrained, by a force greater than that necessary to compress the springs 33 or 34.

Movement of the valve core 22 out of the neutral position shown in FIGURE 1 is resisted by a damping means generally indicated at 35. In the form shown in FIGURE 1, this damping means comprises an impact piston 37 and a rebound piston 36 maintained against a central abutment ring 38 by means of respective springs 40 and 39. The pistons 36 and 37 are provided with large central apertures 41 and 42, respectively, which have an internal diameter substantially greater than the external diameter of the extension 22a of the valve core 22. A valve disc 22b is provided on the core extension 22a between the adjacent faces of the pistons 36 and 37 and, as may be seen, has an external diameter substantially greater than the diameter of either of the apertures 41 and 42. The cylinder 43 within which the pistons 36 and 37 reciprocate is closed at its lower end by means of a welch plug, or the like, 44 and contains hydraulic liquid which provides combined lubricating and shock absorbing functions. The liquid may be introduced during assembly of the device and may be subsequently maintained by insertion into the cylinder 43 by a port in the housing 10 adjacent the upper end of extension 22a. The aperture 29a prevents air locks or hydraulic fluid locks from occurring behind the plunger 29, and apertures 30a and 30b prevent such locks relative to the plunger 30. In the latter case, the aperture 30b vents the valve core and the area behind the plunger 30 to the lower pressure bore 18 via passageway 47.

The pistons 36 and 37 are constructed to assume a loose fit in the bore 43 to thereby permit the gradual flow of hydraulic dampening fluid between the walls of the pistons and the internal surface of the cylinder 43. Accordingly, in operation, when a slowly applied force is directed against the lever 12, in a clockwise direction as viewed in FIGURE 1, the valve core 22 will be biased in the upward direction through the plunger 30 and the spring 34. The valve disc 22b will press against the bottom face of the piston 36 and gradual movement of the piston 36 will take place in the body of hydraulic fluid. This gradual movement is permitted by flow of the hydraulic fluid from above the piston 36 to the area below the piston 36 via the loose fit between the piston 36 and the cylinder 43. While the spring 39 will resist such movement, the spring 39 is of lesser spring rate than the spring 34 so that during the gradual application of forces to the valve core 22, the spring 34 will not compress and will provide a substantially rigid connection between the lever 12 and the core 22.

Alternatively, should the force applied to the lever 12 be an abrupt one and continue for only a very short space of time, no movement of the valve core 22 will take place. Upon the application of such an instantaneous force, the leak-down passage between the piston 36 and the cylinder 43 is insufficient to permit rapid movement of the valve core 22 and therefore the core 22 is held substantially stationary while the spring 34 compresses. When the force is relieved, after a short duration, the lever 12 moves counter clockwise and the spring 34 assumes its initial condition as shown in FIGURE 1.

The application of forces in the counterclockwise direction to the lever 12 will, if gradual, operate to move the valve core 22 downwardly with hydraulic fluid leaking past the piston 37 between the outer wall thereof and the cylinder 43. Similarly, if the force applied to the lever 12 in the counterclockwise direction is of a rapid nature, the hydraulic fluid beneath the piston 37 will prevent movement of the valve core 22 and the spring 33 will, instead, be compressed to permit the plunger 29 to move relative to the core 22.

It will be apparent from a consideration of the dampening structure 35, that it provides quick-return dampening structure in which the valve core 22 may be returned to its neutral condition from any position out of neutral without delay. This rapid return is permitted by the ready flow of hydraulic fluid through either the aperture 41 or 42. Thus, assume that the valve core 22 is positioned in its downward position as viewed in FIGURE 1 with the valve disc 22b in contact with the upper surface of the piston 37 and with spring 40 substantially compressed and the piston 37 moved downwardly away from the abutment 38. Under such circumstances, when the force applied to the lever 12 tending to move the piston 37 into the position thus occupied is released, by movement of the lever 12 in the opposite direction, the valve disc 22b is separated from the piston 37 thereby permitting flow of hydraulic fluid through the aperture 42. This free flow is permitted until such time as the valve core 22 moves upwardly into contact with the piston 36, as shown in FIGURE 1, beyond which position further movement in the upward direction will be resisted by the piston 36 as above described. As a result of this construction the valve core 22 is maintained in its central, neutral, condition and will easily return to that condition from any condition of unbalance to which the valve has been subjected.

Since the lever 12 is directly connected to a vehicle axle part while the housing 10 is connected to the vehicle frame or the like, automatic valve follow-up is provided. Thus, as an increased load is applied to the vehicle body, tending to move the frame downwardly relative to the vehicle wheels, and the valve lever 12 accordingly moved in a counterclockwise direction, the pressure inlet bore 16 is connected to the bore 15 leading to a power cylinder for moving the vehicle frame upwardly again relative to the vehicle axle. Upon such upward movement, however, the lever 12 which is connected to the vehicle axle as above mentioned, will be tilted downwardly in the clockwise direction thereby returning the valve core 22 to its neutral position in which flow is cut off between the conduits 16 and 15. Accordingly, even though the load applied to the vehicle frame is increased, the leveling valve of the present invention will automatically cause pressure to be applied to a power motor to lift the vehicle frame upwardly to its predetermined design condition subsequent to any movement of the frame downwardly relative to the supporting vehicle wheels.

It will be appreciated that the combined resilient connection between the valve core 22 and the lever 12, and the damping device provides a leveling valve having what may be termed a "brain." Specifically, the valve readily operates to reflect changes in gradually applied loads, such as would occur when additional people enter a vehicle, or any other semi-permanent load is applied to it. Subsequent to such a load which is applied over a relatively long period of time, the slowly moving piston 37 will move downwardly to permit downward movement of the core 22 with resultant application of pressurized fluid from the bore 16 to the vehicle body lifting device associated with the conduit 15. On the other hand, should a force be applied to the lever 12, such as would be occasioned by the vehicle traveling over a bumpy road, or other obstruction, the application of force to the lever 12 tending to move it from its neutral condition is short lived and is absorbed by the spring 34 rather than moving the entire valve against the damping piston 36. Accordingly, the leveling valve illustrated will operate to supply pressurized fluid to the vehicle leveling strut or motor only when a relatively permanent load is applied to the vehicle and will not direct pressurized fluid thereto when the vehicle is run over an irregular road or is in any other way operated to provide relatively instantaneous changes of the relative positions of the vehicle frame and the wheels thereof. Likewise, the leveling valve will vent the bore 15 connected to the strut or motor operating to level the vehicle only when a portion of the vehicle load is removed relatively permanently. Instantaneous changes in vehicle frame and vehicle wheel positions in a direction to move the vehicle body upwardly away from the wheels will not cause venting of the bore 15 to the low pressure exhaust bore 18 since the valve core 22 will be prevented from movement under such circumstances by the dampening means 35 above described.

The nature of the dampening means 35 may be simplified somewhat for some installations by providing only a quick return feature in a single direction, or, alternatively, by providing a simple dashpot only in which no quick return feature at all is provided. The former of these two alternatives is illustrated in FIGURE 2 wherein the valve core 22 is provided with an extension 22c carrying an integral damping piston 50 having a passage 51 therethrough under the control of check valve 52. As in the case of the embodiment shown in FIGURE 1, the piston 50 fits the cylinder 43 loosely thereby permitting the gradual movement of fluid between the outer diameter of the piston 50 and cylinder 43. In the downward movement of the valve core 22, responsive to the addition of a relatively permanent or consistently applied load is resisted by the damping action of the piston 50. Upward movement of the valve core 22, however, is permitted in a relatively free manner by fluid flow through the passageway 51 past the check valve 52. The simple dampening means without any quick return feature may, of course, be provided merely by eliminating the passageway 51 from the core extension 22c shown in FIGURE 2.

The quick return form of damping means 35 illustrated in FIGURE 1 is preferred to the unidirectional quick return or the simple damping or dashpot means above described since it automatically permits rapid positioning of the vehicle at the proper attitude almost immediately after the vehicle is started. Thus, if the vehicle should have been standing for a substantial period of time and the system becomes slightly collapsed, the quick return provision of the damping means shown in FIGURE 1 will permit return of the valve core 22 to the neutral condition immediately as soon as fluid under pressure is applied to the leveling struts via the port 15. If no quick return device is present, the vehicle has been sitting for a period of time in such severe weather conditions as would make the hydraulic fluid extremely viscous, the damping effect of the means 35 would, if no quick return feature were provided, retard the movement of the valve core 22 back to neutral condition, thereby permitting an over extension of the leveling strut. This over extension would be followed by an over contraction, with a subsequent slightly smaller over extension until the parts had assumed their designed, neutral, attitude. By the provision of the quick return feature, this initial oscillation, when the system is cold, is completely prevented.

In climates in which the viscosity of the damping fluid will not vary throughout normal operating conditions, the simple dashpot discussed may be utilized satisfactorily since the viscosity of the damping fluid would never become high enough to cause serious initial oscillation of the system. The utilization of a unidirectional quick return mechanism as shown in FIGURE 2 provides a relatively satisfactory compromise which may be utilized in inexpensive installations to provide a minimum of initial oscillation at less cost than the dual direction quick return shown in FIGURE 1. In the unidirectional quick return structure it is, of course, preferred that the check valve be provided to permit rapid flow of the fluid through the piston 50 when the valve core 22 is moved in its upward direction rather than in the downward direction since most ordinary high frequency force applications to the lever 12 will be in a direction tending to move the vehicle wheels upwardly toward the body or, in other words, tending to move the lever 12 to move the piston 50 downwardly. By providing a maximum dashpot action in this direction, the valve core 22 will not respond to the application of such instantaneous forces as are incurred.

A second basic modification of the leveling valve 12 may be seen from a consideration of FIGURE 3. As there shown, a valve housing 100 is mounted generally horizontally of a vehicle frame by means of attaching ears 110. A valve core 220 is reciprocably mounted within the longitudinal bore 140 for reciprocation by lever 120 acting through plungers 290 and 300 and their respective springs 330 and 340. As in the case of the modified form shown in FIGURE 1, air lock or hydraulic fluid lock behind the pistons 290 and 300 is prevented by means of respective apertures 290a and 300a, respectively, in combination with the longitudinal vent passageway 300b leading to the low pressure discharge or vent bore 180 via passageway 470.

Fluid under pressure is applied to the valve body 100 by a lateral bore 160 and is directed to a vehicle leveling strut or the like via bore 150. The lateral bore 160 is, of course, preferably provided with a check valve substantially identical to that shown at 17 in FIGURE 1 in order to prevent hydraulic pulses in the leveling system from affecting the source of pressurized fluid. Fluid vented from the bore 150 when the vehicle leveling struts are collapsed, passes out through the vent bore 180 to a sump, in the case of systems utilizing liquids, or to atmosphere in the case of systems utilizing pressurized gas.

In operation, movement of the lever 120 in a counterclockwise direction as viewed in FIGURE 3 will occur when the vehicle body, carrying the valve body 100, is additionally loaded and moves downwardly relative to the vehicle wheels. Such counterclockwise movement of the lever 120 will move the valve core 220 to the right through the resilient spring 330 and plunger 290 to thereby connect the lateral bore 160 to the bore 150 via the annular groove 230. The application of pressure to the bore 150, and hence to the vehicle body lifting strut, will cause the body to move upwardly, thereby returning the lever 120 to its neutral position in which the valve core 220 is shifted to again close off the communication between the bores 150 and 160. The valve core 220 under the direction of the lever 120 thus operates to maintain the vehicle in a predetermined level condition.

In order to prevent constant recycling of the system, in which pressurized fluid is first introduced to the struts via bore 150 and is then vented from the struts to the bore 180, in rapid succession as a result of the application of instantaneous forces to the lever 120, a dashpot generally indicated at 350 is provided. The dashpot or damping means 350 is substantially the same in function as that described in connection with the embodiment shown in FIGURE 1. It is, however, constructed for operation in a horizontal position and may be substantially more compact than the overall unit shown in FIGURE 1. As shown in FIGURE 3, the damping means 350 comprises a pair of reciprocably mounted pistons 370 and 360 centered against abutment plug 380 by springs 390 and 400. The outside diameters of the pistons 360 and 370 are somewhat smaller than the inside diameter of the cylinder 430 in which they slide, thereby permitting gradual flow of fluid past the outside of the pistons 360 and 370 under all conditions of movement. Accordingly, when the lever 120 moves to reciprocate the valve core 220 in either direction away from the neutral position shown in FIGURE 3, such movement of the valve core 220 is resisted by one or the other of the pistons 360 and 370. In the form shown in FIGURE 3, movement of the pistons 360 and 370 back to the neutral position is readily accomplished by means of the check valves 361 and 371, respectively, thereby providing the quick return dashpot or damping means which prevents initial oscillations of the system as above described in connection with the embodiment shown in FIGURE 1. Hydraulic liquid, such as for example shock absorber fluid may be introduced into the cylinder 43 via an inlet 431. In operation, it is preferred that the liquid level in the cylinder 430 completely cover the pistons 360 and 370.

By providing the lateral extension 221 on the valve core 220 for cooperation with the pistons 360 and 370, the adapting means 350 may be placed in the horizontal position as shown in FIGURE 3. Further, it will be understood that the lateral arm 221 may be extended from the valve core 220 in substantially any direction radially of the axis of reciprocation of the valve core to thereby permit placement of the damping means 350 in substantially any convenient position relative to the valve core 220. This, of course, permits a maximum of versatility and makes possible the use of the leveling valve shown in FIGURE 3 with any different types of vehicle suspensions without a fundamental change in the operating parts.

The damping means or dashpot 350 may, similarly to the damping means 35 discussed above, comprise a simple dashpot rather than the somewhat expensive quick return mechanism illustrated in FIGURE 3, where minimization of expense is necessary and the initial oscillations are considered insufficiently important to warrant the additional expense of a quick return damping means. Such a simple dashpot is illustrated in FIGURE 4 wherein the valve core 220 is shown directly connected to a single reciprocable piston 365 by means of the arm 221. The piston 365 is provided with a restricted orifice 366 which permits the gradual flow of hydraulic fluid back and forth past the piston 365. This simple form of dashpot, in which an apertured piston is utilized, may, of course, be utilized in the embodiment shown in FIGURE 1 and will operate in either of the embodiments shown in FIGURES 1 and 3 to prevent movement of the reciprocable valve core in response to instantaneous short term force applications tending to change the relative positions of the vehicle body and wheels. With the application of a relatively permanent load change or any other force tending to cause a consistent change in the relative position between the vehicle body and the vehicle wheel, in which the lever 120 is moved either clockwise or counterclockwise and stays in its new position for a substantial period of time, the gradual flow of fluid through the orifice 366 will permit the piston 365 to allow movement of the valve 220 to align either the pressurized fluid inlet bore 160 or the low pressure exhaust bore 180 with the vehicle level controlling strut bore 150.

It will thus be seen that I have provided a novel control valve for vehicle leveling systems wherein the valve is capable of sensing the general nature of the variations in vehicle level and causes the application of hydraulic fluid to change the vehicle level only after the application of a relatively permanent or consistent load variation. The valve automatically refuses to operate to change the vehicle leveling apparatus when instantaneous forces are applied to the valve as a result of operation of the vehicle over rough roads or the like. As a result of this selectivity of the valve, a minimum of pressurized fluid for operating the vehicle leveling struts is required since the valve does not constantly recycle in response to instantaneous variations in vehicle loading. Pressure under fluid is, instead, directed to the vehicle leveling struts or motors only after a relatively permanent load change has been made, and, accordingly, the vehicle suspension is maintained at a predetermined optimum position at all times.

Instantaneous variations in loading, which do not reflect the addition or substraction of relatively permanent loads from the vehicle will not in any way affect the leveling of the vehicle and, accordingly, a superior system is provided in which only forces of consistently applied types are operative to cause the valve to adjust attitude of the vehicle.

It is, of course, understood that variations and modifications may be made in accordance with the principles of the present invention without departing from the scope of the novel concepts thereof. Accordingly, it is my intention that the scope of the present invention be limited solely by that of the hereinafter appended claims.

I claim as my invention:

1. A control valve comprising a ported valve housing and a cooperating single valve core movable relative thereto in opposite directions away from a middle position for control purposes, actuating means for moving said core selectively in said opposite directions, means operatively connecting said actuating means to said core, and time delay means operatively connected to said core and preventing movement of said core away from its middle position except upon continued application of valve actuating force to said actuating means, said connecting means comprising a cavity in said core and a projection on said actuating means projecting into said cavity and spring centering means between said projection and the walls of said cavity acting to continuously bias said projection to a predetermined axially central neutral position, and means for preventing each of said springs from moving said projection beyond said predetermined centered position relative to said core.

2. A control valve comprising a ported valve housing and a cooperating single valve core movable relative thereto in opposite directions away from its middle position, for control purposes, actuating means for moving said core in opposite directions, means operatively connecting said actuating means to said core to move the core selectively in said opposite directions, and time delay means operatively connected to said core and preventing movement of said core away from its middle position except upon continued application of valve actuating force to said actuating means, said connecting means comprising a cavity in said core, a projection on said actuating means projecting into said cavity and a spring compressed between each side of said projection and the wall of said cavity adjacent thereto and means positively centering said springs relative to said core and said actuating means.

3. A control valve comprising a ported valve housing and a cooperating single valve core movable in opposite directions relative thereto, actuating means for moving said core, means operatively connecting said actuating means to said core to move it in either direction selectively and comprising a resilient lost motion connection, and time delay means for preventing movement of said core except upon continued application of valve actuating force to said actuating means, said time delay means comprising a member secured to said core and positioned for movement from a first position corresponding to a valve-neutral position to alternative positions on opposite sides of said first position, one-way fluid damping means operatively connected to said member and preventing rapid movement of said member away from said first position in at least one direction but operative to permit rapid movement back to said first position from said one position.

4. A control valve comprising a ported valve housing and a cooperating single valve core movable in opposite directions relative thereto, actuating means for moving said core, means operatively connecting said actuating means to said core to move it in opposite directions selectively and comprising a resilient lost motion connection, and time delay means for preventing movement of said core except upon continued application of valve actuating force to said actuating means, said time delay means comprising a member secured to said core and positioned for movement from a first position corresponding to a valve-neutral position to alternative positions on opposite sides of said first position, one-way fluid damping means operatively connected to said member and preventing rapid movement of said member away from said first position in either direction but operative to permit rapid movement back to said first position from either of said alternative positions.

5. A control valve comprising a body having a longitudinal bore, a valve core reciprocable in said bore and having three spaced annular grooves adjacent one end thereof, a first laterally extending bore in said body aligned with the central groove, a second laterally extending bore in said body aligned with one of the grooves adjacent the central groove and having fluid under pressure applied thereto, a third laterally extending bore in said body aligned with the other of the grooves adjacent the central groove and connected to a low pressure space, actuating means for reciprocating said core, a resilient lost motion connection between said actuating means and said core and time delay means preventing movement of said core except upon a consistent application of force to said actuating means whereby instantaneously applied forces applied to said body relative to said actuating means are absorbed in said resilient connection without movement of said valve core and without interconnecting said bores, said time delay means comprising a member secured to said core and reciprocable therewith and positioned for movement from a first position corresponding to a valve neutral position to alternative positions on opposite sides of said first position, one-way fluid damping means operatively connected to said member and preventing rapid movement of said member away from said first position in at least one direction but operative to permit rapid movement back to said first position from either of said alternative positions.

6. A control valve comprising a body having a longitudinal bore, a valve core reciprocable in said bore and having three spaced annular grooves adjacent one end thereof, a first laterally extending bore in said body aligned with the central groove, a second laterally extending bore in said body aligned with one of the grooves adjacent the central groove and having fluid under pressure applied thereto, a third laterally extending bore in said body aligned with the other of the grooves adjacent the central groove and connected to a low pressure space, actuating means for reciprocating said core, a resilient lost motion connection between said actuating means and said core and time delay means preventing movement of said core except upon a consistent application of force to said actuating means whereby instantaneously applied forces applied to said body relative to said actuating means are absorbed in said resilient connection without movement of said valve core and without interconnecting said bores, said time delay means comprising a member secured to said core and reciprocable therewith and positioned for movement from a first position corresponding to a valve neutral position to alternative positions on opposite sides of said first position, means preventing rapid movement of said member away from said first position in at least one direction but operative to permit movement back to said first position rapidly, said last named means comprising a body of liquid surrounding said member and contained within a cylindrical bore extending substantially coaxially with said core in said body, a piston mounted on one side of said member in said cylinder, resilient means urging said piston against said member and valve means associated with said piston for substantially restricting flow of fluid past said piston as said piston is moved against said last named spring and substantially reducing said resistance as said piston moves in the opposite direction.

7. A control valve comprising a body having a longitudinal bore, a valve core reciprocable in said bore and having three spaced annular grooves adjacent one end thereof, a first laterally extending bore in said body aligned with the central groove, a second laterally extending bore in said body aligned with one of the grooves adjacent the central groove and having fluid under pressure applied thereto, a third laterally extending bore in said body aligned with the other of the grooves adjacent the central groove and connected to a low pressure space, actuating means for reciprocating said core, a resilient lost motion connection between said actuating means and said core and time delay means preventing movement of said core except upon a consistent application of force to said actuating means whereby instantaneously applied forces applied to said body relative to said actuating means are absorbed in said resilient connection without movement of said valve core and without interconnecting said bores, said time delay means comprising a member secured to said core and reciprocable therewith and positioned for movement from a first position corresponding to a valve neutral position to alternative positions on opposite sides of said first position, means preventing rapid movement of said member away from said first position in at least one direction but operative to permit movement back to said first position rapidly, said last named means comprising a body of liquid surrounding said member and contained within a cylindrical bore extending substantially parallel to said core in said body, a piston mounted on one side of said member in said cylinder, resilient means urging said piston against said member and valve means associated with said piston for substantially restricting flow of fluid past said piston as said piston is moved against said last named spring and substantially reducing said resistance as said piston moves in the opposite direction.

References Cited in the file of this patent

UNITED STATES PATENTS

| | | |
|---|---|---|
| 107,178 | Kean | Sept. 6, 1870 |
| 669,274 | Ward | Mar. 5, 1901 |
| 1,371,648 | Schmidt | Mar. 15, 1921 |
| 1,560,439 | Trenor | Nov. 3, 1925 |
| 2,088,528 | McCune | July 27, 1937 |
| 2,579,084 | Krotz | Dec. 18, 1951 |
| 2,670,201 | Rossman | Feb. 23, 1954 |

FOREIGN PATENTS

| | | |
|---|---|---|
| 352,171 | Italy | Sept. 7, 1937 |